(12) United States Patent
Falkenberg et al.

(10) Patent No.: US 10,007,647 B2
(45) Date of Patent: Jun. 26, 2018

(54) ADAPTING AND VALIDATING GRAPHICAL USER INTERFACES FOR TARGET DEVICES

(71) Applicant: International Business Machines Corporation, Armonk, NY (US)

(72) Inventors: Matthias X. Falkenberg, Stuttgart (DE); Stephan Laertz, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 15/162,084

(22) Filed: May 23, 2016

(65) Prior Publication Data
US 2017/0337166 A1 Nov. 23, 2017

(51) Int. Cl.
*G06F 3/0484* (2013.01)
*G06F 17/22* (2006.01)
*G09G 5/00* (2006.01)
*G06F 17/21* (2006.01)

(52) U.S. Cl.
CPC ...... *G06F 17/2247* (2013.01); *G06F 3/04845* (2013.01); *G06F 17/212* (2013.01); *G09G 5/005* (2013.01)

(58) Field of Classification Search
None
See application file for complete search history.

(56) References Cited

U.S. PATENT DOCUMENTS

| 7,770,109 | B2 | 8/2010 | Fortes | |
| 7,996,765 | B1 * | 8/2011 | Mitnick | G06F 17/227 715/204 |
| 8,589,790 | B2 | 11/2013 | Seolas et al. | |
| 8,606,329 | B2 * | 12/2013 | Yu | G06F 17/30899 455/566 |

(Continued)

OTHER PUBLICATIONS

IBM; "Method and System for Rendering Device Specific Enterprise Web Content"; An IP.com Prior Art Database Technical Disclosure; Feb. 9, 2010, 5 pages. <https://priorart.ip.com/IPCOM/000193063>.

(Continued)

*Primary Examiner* — Asher D Kells
(74) *Attorney, Agent, or Firm* — Patterson + Sheridan, LLP

(57) ABSTRACT

Systems, methods, and computer program products to perform an operation for validating and adapting a GUI structure to a screen of a client device. The operation comprises receiving by the client device a software agent together with a device dependent arrangement rule. The software agent is adapted for analyzing received GUI code for identifying GUI elements to be rendered on the screen and determining a relative arrangement of the rendered GUI elements. If the relative arrangement is not compliant with the device dependent arrangement rule, the software agent determines a distance between GUI elements of the relative arrangement and a relative arrangement of the GUI elements in accordance with the device dependent arrangement rule, amends the GUI code to re-arrange the GUI elements towards the improved arrangement, and re-renders the GUI elements for the screen using the amended GUI code.

19 Claims, 12 Drawing Sheets

(56) References Cited

U.S. PATENT DOCUMENTS

| | | | |
|---|---|---|---|
| 2005/0223319 A1* | 10/2005 | Ohashi | G06T 11/206 |
| | | | 715/248 |
| 2010/0023875 A1 | 1/2010 | Choudhary et al. | |
| 2010/0029340 A1 | 2/2010 | Klassen et al. | |
| 2012/0131442 A1* | 5/2012 | Grizim | G06F 17/211 |
| | | | 715/234 |
| 2014/0317489 A1 | 10/2014 | Lal et al. | |
| 2015/0074518 A1* | 3/2015 | Rumsey | G06F 17/248 |
| | | | 715/235 |
| 2015/0269271 A1 | 9/2015 | Liu et al. | |

OTHER PUBLICATIONS

Paterno, F. et al.; "Desktop-to-Mobile Web Adaptation through Customizable Two-Dimensional Semantic Redesign", Human-Centered Software Engineering, 6409, Springer, pp. 79-94, 2010, Lecture Notes in Computer Science, 978-3-642-16487-3, submitted Aug. 11, 2014. URL: <https://hal-hcl.archives-ouvertes.fr/hal-01055195/document>.

\* cited by examiner

```
var validationPolicies = [
{
        "userAgents": [
        // Chrome for Windows
        ".*Windows.*Chrome.*",
        // Firefox for Windows
        ".*Windows.*Firefox.*"
],
        "client": {
        "os": "windows",
        "type": "desktop"
},
"vectors": [{
        "lengthLBBound": 135.4,
        "lengthUpperBound": 138.5,
        "angleLBBound": 81.5,
        "angleUpperBound": 81.7
},
{
        "lengthLBBound": 299.6,
        "lengthUpperBound": 309.7,
        "angleLBBound": 86.1,
        "angleUpperBound": 86.3
},
{
        "lengthLBBound": 752.0,
        "lengthUpperBound": 752.6,
        "angleLBBound": 10.2,
        "angleUpperBound": 10.5
},
{
        "lengthLBBound": 812.2,
        "lengthUpperBound": 818.2,
        "angleLBBound": 24.3,
        "angleUpperBound": 25.3
}],
"vectorSum": {
        "lengthLBBound": 1767.4,
        "lengthUpperBound": 1783.0,
        "angleLBBound": 30.6,
        "angleUpperBound": 31.6
        }
},
```

```
{
"userAgents": [
        // iPad
        ".*iPad.*"
],
"client": {
        "os": "ios",
        "type": "tablet"
},
"vectors": [{
        "lengthLBBound": 135.4,
        "lengthUpperBound": 138.5,
        "angleLBBound": 81.5,
        "angleUpperBound": 81.7
},
{
        "lengthLBBound": 299.6,
        "lengthUpperBound": 309.7,
        "angleLBBound": 86.1,
        "angleUpperBound": 86.3
},
{
        "lengthLBBound": 507.9,
        "lengthUpperBound": 508.8,
        "angleLBBound": 15.2,
        "angleUpperBound": 15.7
},
{
        "lengthLBBound": 603.9,
        "lengthUpperBound": 613.5,
        "angleLBBound": 35.7,
        "angleUpperBound": 37.0
}],
"vectorSum": {
"lengthLBBound": 1373.6,
"lengthUpperBound": 1395.3,
"angleLBBound": 42.0,
"angleUpperBound": 43.1
        }
}, ...
```

FIG. 6

ADAPTING AND VALIDATING GRAPHICAL USER INTERFACES FOR TARGET DEVICES

FIELD OF THE DISCLOSURE

The disclosure relates generally to a method for validating arrangements of elements in a viewport, and more specifically, to a method for validating and adapting a graphical user interface structure to a screen of a client device. The disclosure relates further to a related system and a computer program product.

BACKGROUND

Companies develop applications and websites that use Web technologies for both desktops and mobile devices. Currently, there is an increasing focus on mobile devices implemented as so-called "mobile first" strategies. While the number of web browsers and the hardware specification for desktops is comparably clear, the number of target mobile devices and the software environments in the market is huge and growing at an ever increasing speed.

Therefore, the options for testing applications and websites are limited to a selection of operating systems, web browsers, web browser versions, device capability, etc. This may lead to an uncertainty whether or not an application or website is rendered properly on a given device used by targeted end-users, i.e., by the customers and partners of companies using a specific application or website.

Users have a low tolerance for applications and websites that are flawed. This includes backing implemented responsive web designs and broken layouts. Furthermore, users rarely make use of typical feedback channels, e.g., feedback forms or e-mail addresses of technical support.

Thus, although end-users expect error-free webpages on any given mobile device, developers are challenged by the exploding number of mobile devices—including software environments—in light of mobile devices that are introduced into the market after the website has been launched.

SUMMARY

According to one aspect of the present disclosure, a method for validating and adapting a graphical user interface structure to a screen of a client device may be provided. The method may comprise receiving, by the client device, a software agent together with a device dependent arrangement rule. The software agent may be adapted for analyzing received graphical user interface code for identifying graphical user interface elements to be rendered on the screen and determining a relative arrangement of the rendered graphical user interface elements to each other and relative to the screen. If the relative arrangement is not compliant with the device dependent arrangement rule, the software agent may determine a distance between graphical user interface elements of the relative arrangement and a relative arrangement of the graphical user interface elements in accordance with the device dependent arrangement rule, representing an improved arrangement, amend the graphical user interface code to re-arrange the graphical user interface elements towards the improved arrangement, and re-rendering the graphical user interface elements for the screen using the amended graphical user interface code.

According to another aspect of the present disclosure, a system for validating and adapting a graphical user interface structure to a screen of a client device may be provided. The system may comprise a receiver adapted for receiving, by the client device, graphical user interface code and a device dependent arrangement rule, an analyzer module adapted for analyzing received graphical user interface code for identifying graphical user interface elements rendered by a rendering unit on the screen, and a first determination module adapted for determining a relative arrangement of the rendered graphical user interface elements to each other and relative to the screen.

The system may further comprise a second determination module adapted for a determination of a condition that the relative arrangement is not compliant with the device dependent arrangement rule, wherein the second determination module may also be adapted for a determination of a distance between graphical user interface elements of the relative arrangement and a relative arrangement of the graphical user interface elements in accordance with the device dependent arrangement rule, representing an improved arrangement. The system may additionally comprise an amending unit adapted for amending the graphical user interface code to rearrange the graphical user interface elements towards the improved arrangement. The rendering unit may be adapted for re-rendering the graphical user interface elements on the screen using the amended graphical user interface code.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

FIG. 6 shows two examples of the device dependent arrangement rule, according to one embodiment.

DETAILED DESCRIPTION

Figure 1:
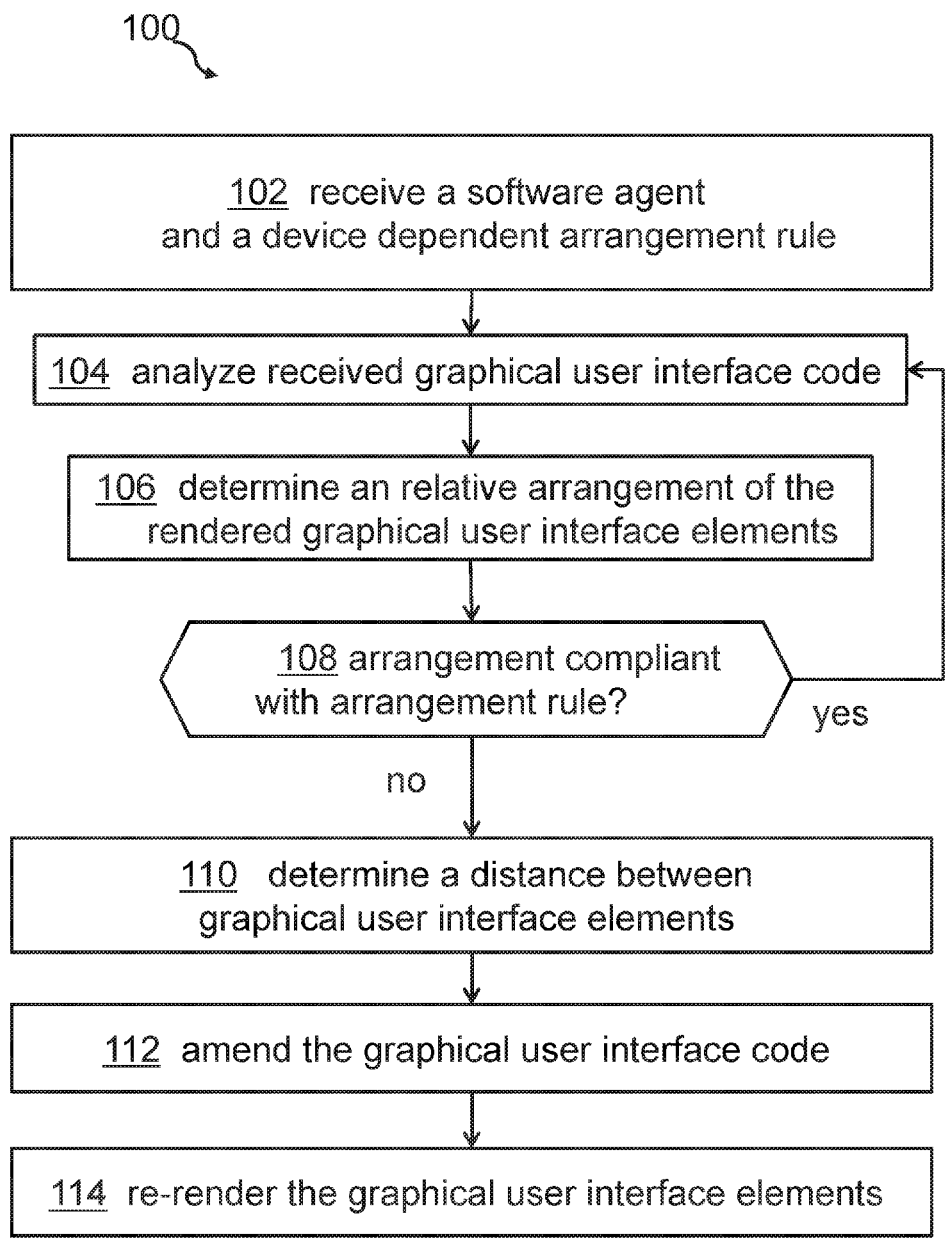
FIG. 1 shows a block diagram of an embodiment of the inventive method for validating and adapting a graphical user interface structure to a screen of a client device, according to one embodiment.

In the context of this description, the following conventions, terms and/or expressions may be used:

The term "graphical user interface" ("GUI") may denote any user interface adapted for being manipulated using a pointing device like a mouse, a trackball, or a finger or stylus on a touchscreen device. It is a type of interface that allows users to interact with electronic devices through graphical icons and visual indicators such as secondary notation, as opposed to text-based interfaces, typed command labels or text navigation. A GUI may comprise a series of elements or building blocks which are arranged in the GUI.

The term "graphical user interface structure" may denote an arrangement of elements or building blocks within the GUI. Elements may be arranged in different layout variants. They may be arranged side by side, below each other, all on one viewport and the like. Details are discussed in the context of the figures below.

The term "software agent" may denote software code to be executed. The software agent may be downloaded from a server to a client. The client may run a web browser and the software agent may be executed outside—i.e., independent—or as part of the browser.

The term "device dependent arrangement rule" may denote a policy defining how elements of a view port may be arranged on a specific device. It may be noted that the definition of a device may comprise hardware and software components—operating system type/version and/or browser type/version—may be executed on the hardware device.

The term "graphical user interface code" may denote a set of defining language elements defining which and how graphical or textual elements may be positioned within a viewport of a browser window. The code may, e.g., be HTML (hypertext markup language), JavaScript and the like. It may explicitly be noted that also CCS (Cascades Style Sheets) represent another commonly used language to define element characteristics rendered by a web browser.

The term "viewport" may denote the visible portion of a 2-dimensional area which may be larger than the visualization device. In web browsers, the viewport may be the visible portion of an entire document. If the document may be larger than the viewport, the user may shift the viewport around by scrolling horizontally or vertically.

The term "relative arrangement" may denote here the kind in which different elements are arranged in a GUI. The relative arrangement may be expressed on terms of reference points of the elements to each other, as well as to a viewport of a browser window.

The term "improved arrangement" may denote a relative arrangement which may be more user friendly, in that elements may not be laying over each other, being rendered outside a viewport or may be other deficiencies which may be avoided by a better or improved arrangement.

The term "CSS class" may denote a class defined in CSS (cascading style sheets), a mechanism used to design and describe elements to be rendered in a GUI.

The term "web content management system" (WCMS) may denote a computer application that supports the creation and modification of digital content using a common user interface and thus, usually supporting multiple users working in a collaborative environment. Content management system (CMS) features may vary widely. Some CMSes include Web-based publishing, format management, edit history and version control, indexing, search, and retrieval. By their nature, content management systems support the separation of content and presentation. A web content management system is a CMS designed to support the management of the content of web pages. Most popular CMSes are also WCMSes. Web content includes text and embedded graphics, photos, video, audio, and code (e.g., for applications) that displays content or interacts with the user. Such a CMS typically may comprise at least two major components: (a) a content management application (CMA) is the front-end user interface that allows a user, even with limited expertise, to add, modify and remove content from a website without the intervention of a webmaster; and (b) a content delivery application (CDA) compiles that information and updates the website.

The term "polar coordinates" may denote here a two-dimensional coordinate system in which each point on a plane is determined by a distance from a reference point and an angle from a reference direction. The reference point (analogous to the origin of a Cartesian system) is called the pole, and the ray from the pole in the reference direction is the polar axis. The distance from the pole is called the radial coordinate or radius, and the angle is called the angular coordinate, polar angle, or azimuth.

The term "element" may denote here a building block in a GUI. It may be a portlet, an input or output field of an application or any other graphical building block to be displayed in a viewport of a browser window.

The term "mobile device" may denote here any device defined by its hardware and related software environment (operating system, browser name/type/version, etc.). It may actually also be a desktop device, a smartphone, a tablet computer a phablet computer, an in-car computer or any other device adapted to receive and display website or applications based on typical Internet protocols. Thus, the term mobile device may be a representative or synonym for any device, in particular, devices that have been unknown to developers at design time and that came to market after design time. The appearance of web content on these devices may not have been tested at design time.

The term "distance" may be understood as a result of a mathematical comparison of vectors in polar coordinates. A vector sum of reference points of elements in a view port (or on a screen) may be compared to a vector sum of a reference layout of elements of a viewport (or screen) having upper and lower bounds. Middle values between the upper and lower bounds (e.g., for the length and the angle) of the vector sum of a reference layout of elements may define the reference vector. If the coordinates (i.e., length and angle) of the vector sum lies outside the bounds, the distance may be denotes as too large. Hence, it may be concluded that the design may be broken.

The proposed method for validating and adapting a graphical user interface structure to a screen of a client device may offer multiple advantages and technical effects:

Firstly, the existence of broken website designs becomes more unlikely or may even be eliminated altogether. The user experience with a given website (also on unknown devices) will be increased at the same time. One of the reasons for this is that not only a browser for a given mobile device cares (within the limits of a responsive design concept) to adapt a given web page to a screen of a mobile device. Besides the capabilities of browsers, an additional software agent cares about a proper layout of webpages, even on novel and unknown devices with unknown form factors and potentially also unknown browsers and/or browser versions.

If a browser would generate, even under the regime of responsive design, a broken layout, the software agent will become active trying to repair the damaged layout. It may use a device dependent arrangement rule potentially amend the received graphical user interface code, and then re-render the graphical user interface elements in order to avoid a broken layout of a viewport. Even in the case that there is no device dependent arrangement rule, the software agent may combine different known device dependent arrangement rules of comparable devices and compute its own new, recommended device dependent arrangement rule, which may immediately be applied to generate an "unbroken" design.

Then, a feedback mechanism may be triggered automatically. In one embodiment, the new recommended device dependent arrangement rule may be sent back to a server for a validation by an operator or a developer using the CMS. Together with this new device dependent arrangement rule, also the available data used for the computing of the new device dependent arrangement rule may also be sent to the server for a valuation. In another embodiment, the user of the website may deliver feedback using the GUI to the system to express impressions about the re-rendered viewport. This may be achieved by a "yes"/"no" decision, i.e., "I like it" vs. "I don't like it", which is a well-known communication format on state-of-the-art websites. Thus, the user does not need to learn any new tricks in order to deliver his feedback. This may then in turn also be used by a server-side determination/validation of the new, recommended device dependent arrangement rule. If the device dependent arrangement rule may be accepted by the developer, it may become part of a pool of the device dependent arrangement rules relating to different device/software combinations.

It may also be noted that instead of the approach of using the screen as reference frame for the arranged elements, a viewport may act as reference frame instead of the display itself. However, in many cases on mobile devices the display or screen may be identical with a viewport.

In the following, additional embodiments are described.

According to one embodiment, an element may be described using CSS classes. They may enable a clear cut identification of elements or building block rendered in a GUI.

According to one embodiment, a web content management system may generate a proposal for a definition of a required CSS class for a graphical user interface element and/or a proposal for a device dependent arrangement rule during a web page design process. It may be noted that in real-life situations, more than one CSS class may be proposed as well as multiple device dependent arrangement rules. A web designer busy with designing a web page may then pick and choose such a CSS class most suitable for his newly designed element. The recommendations may be displayed to the developer in a separate window of his development environment, i.e., WCMS.

According to another embodiment, analyzing the graphical user interface elements comprises using polar coordinates for a reference point of the element relative to a reference point of the screen or viewport. Such a reference point of the element may, e.g., be a top left corner of an element. The related reference point of a screen may, e.g., also be a top left corner of the screen or viewport. This may allow defining positions or arrangements of elements simply by an angle and a length of a vector from the top left corner of the screen or viewport to the top left corner of the element. It may be clear to a person skilled in the art that polar coordinates may easily be transformed into Cartesian coordinates.

According to yet another embodiment, the device dependent arrangement rule may comprise a definition of a rendering environment and a validation rule comprising reference data values for validating a given rendering of the graphical user interface elements. The rendering environment may describe a type of a device, a screen size, a browser identifier and a related version. Thus, the rendering environment may be described in terms of hardware characteristics as well as software characteristics.

According to another embodiment, the definition of a rendering environment may also comprise at least one out of the group comprising a class of a mobile device (e.g., a tablet computer, desktop computer, a smartphone, an in-car computer screen), a layout mode (e.g., portrait or landscape), a web browser name (e.g., Firefox®, Chrome®, Safari®, Opera®, Internet Explorer®, Edge®, etc.), and a related web browser version. This way a clear identification may be available of the environment in which a received GUI code may be displayed.

Figure 5:
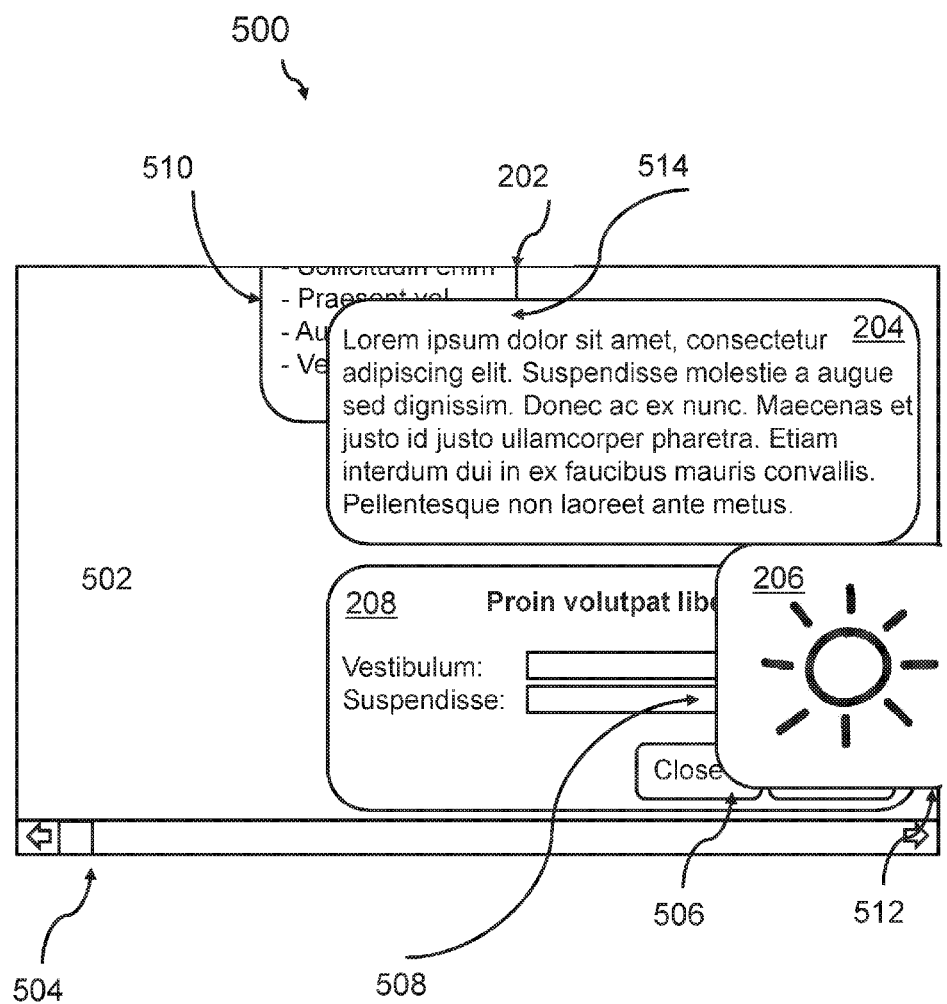
FIG. 5 shows a block diagram of an embodiment of a viewport with badly arranged elements, according to one embodiment.

According to another embodiment, the validation rule may define at least one condition selected out of the group comprising: any two of the graphical user interface elements are non-overlapping when being rendered on the screen, the graphical user interface elements are rendered inside a viewport, unused viewport space is above a predefined threshold value, and there exist only reachable application controls button in the viewport (no unreachable control button in the viewport). Thus, all user unfriendly and difficult to handle user arrangements of elements may be avoided. FIG. 5 depicts examples of broken designs.

According to another embodiment, if during a process of determining compliance with the existing relative arrangement the screen dependent arrangement rule, it is determined that not any screen dependent arrangement rule exists, the software agent may compute a new screen dependent arrangement rule. Additionally, the GUI elements may be re-rendered under constraints of the new screen dependent arrangement rule, and the re-rendered graphical user interface elements may be displayed together with a feedback input field on the screen.

This may immediately test the computed new screen dependent arrangement rule and collect feedback from a user. The user may have two options to respond, a positive one and a negative one. It may reflect specifics of the device including the related software in order to propose an element arrangement which may not be in conflict with other known, received device dependent arrangement rules. Several existing device dependent arrangement rules may be tried out by the algorithm underlying the method, and a best newly computed device dependent arrangement rule may be selected.

This new device dependent arrangement rule may be sent from the software agent to a server validation. Moreover, collected information about said noncompliance may be sent to the server. The collected information may include vectors about reference points (e.g., the top left corner) of each displayed element of the viewport, sizes of the elements, and areas of overlap or conflicts with existing device dependent arrangement rules. A simple unified indicator may be expressed in non-compliance of a vector sum of allowed reference arrangement or layouts of a given viewport for a specific device.

Once received by the server, the new device dependent arrangement rule may be verified or confirmed. Alternatively, according to another embodiment, the software agent may send a plurality of new device dependent arrangement rules to the server. A developer may confirm the new device dependent arrangement rule or may select the most appropriate newly received device dependent arrangement rule. Instead of being performed manually, in an alternative embodiment, the validation may be performed automatically by a component of the web content management system.

FIG. 1 is a flow chart illustrating a method 100 for validating and adapting a graphical user interface structure to a screen of a client device. As shown, the method begins at block 102, where a client device receives a software agent and a device dependent arrangement rule. The device dependent arrangement rule may be received as part of the software agent or independently from the software agent. If the device (and/or the related software environment) is unknown, the software agent may request from the server a plurality of device dependent arrangement rules. This may be instrumental if a new device dependent arrangement rule may be needed to be computed.

At block 104, the software agent may analyze the received graphical user interface code for identifying graphical user interface to be rendered on the screen. At block 106, the software agent may determine a relative arrangement of the rendered graphical user interface elements to each other and relative to the screen. This may also be performed for web pages designed under the responsive design rules because it is not guaranteed that responsive design always leads to a perfect arrangement of elements in viewports, even if the browser is capable of rearranging elements in a viewport. The relative arrangement may be performed by using reference points of the screen and the elements, like, e.g., top left corners of each of the named.

At block 108, the software agent may determine whether the relative arrangement is in compliance with the device dependent arrangement rule. If the relative arrangement is compliant with the arrangement rule, the method may return to block 104. If the arrangement is not compliant with the arrangement rule, the method proceeds to block 110, where the software agent determines a distance between graphical user interface elements of the relative arrangement and a relative arrangement of the graphical user interface elements in accordance with the device dependent arrangement rule, representing an improved arrangement. An improved arrangement may facilitate a better usability and a better user experience of the web page.

At block 112, the software agent may amend the graphical user interface code to re-arrange the graphical user interface elements towards the improved arrangement. At block 114, the agent may re-render graphical user interface elements for the screen using the amended graphical user interface code.

It may be mentioned that in at least one embodiment, a viewport—i.e., top left corner—may be used as reference point.

Figure 2:
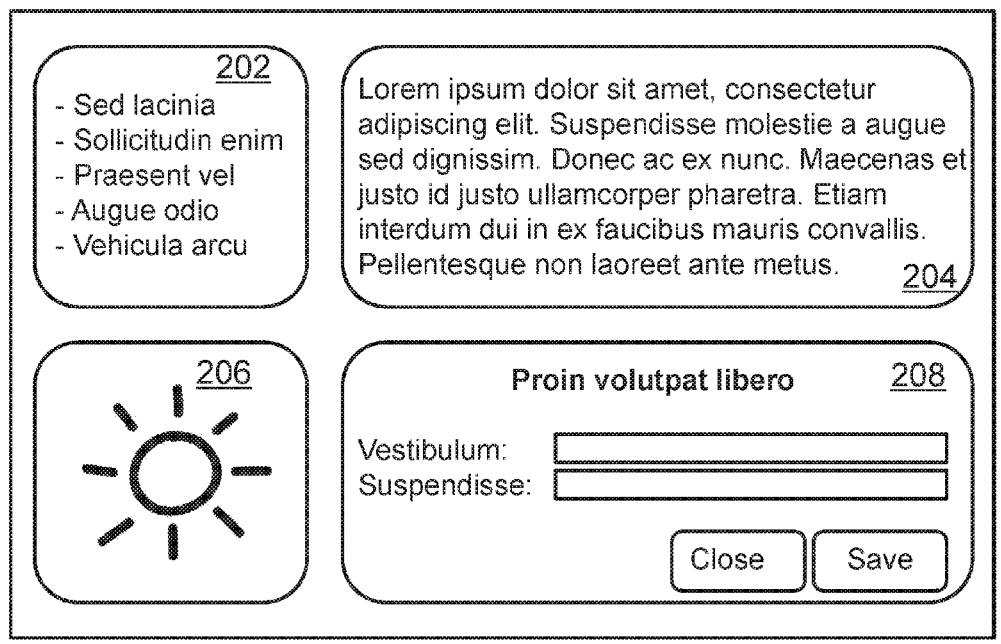
FIG. 2 shows a block diagram of an embodiment of a viewport having a non-conflicting arrangement of elements, according to one embodiment.

FIG. 2 is a block diagram illustrating a viewport 200 having a non-conflicting arrangement of elements, according to one embodiment. Four building blocks or elements 202, 204, 206, 208 (or portlets) are shown in the viewport 200. They may have been designed using a web content management system which may also embed JavaScript functions into applications relating to the elements 202-208 to access the building blocks when they are rendered on a target device. In order to easily manage and manipulate the elements, the web content management system may facilitate the definition of required CSS classes. This may enhance the reliability of the proposed system and make it less dependent on manual coding. In at least one embodiment, two of the portlets are used for information output, namely portlet 202 and 204, while element 206 represents a graphical element. Portlet 208 presents two input fields together with the headline and the two action buttons "close" and "save". Clearly, this represents an arrangement of elements in compliance with design rules. The screen may be a regular personal computer wide screen (e.g., 9:16).

Figure 3:
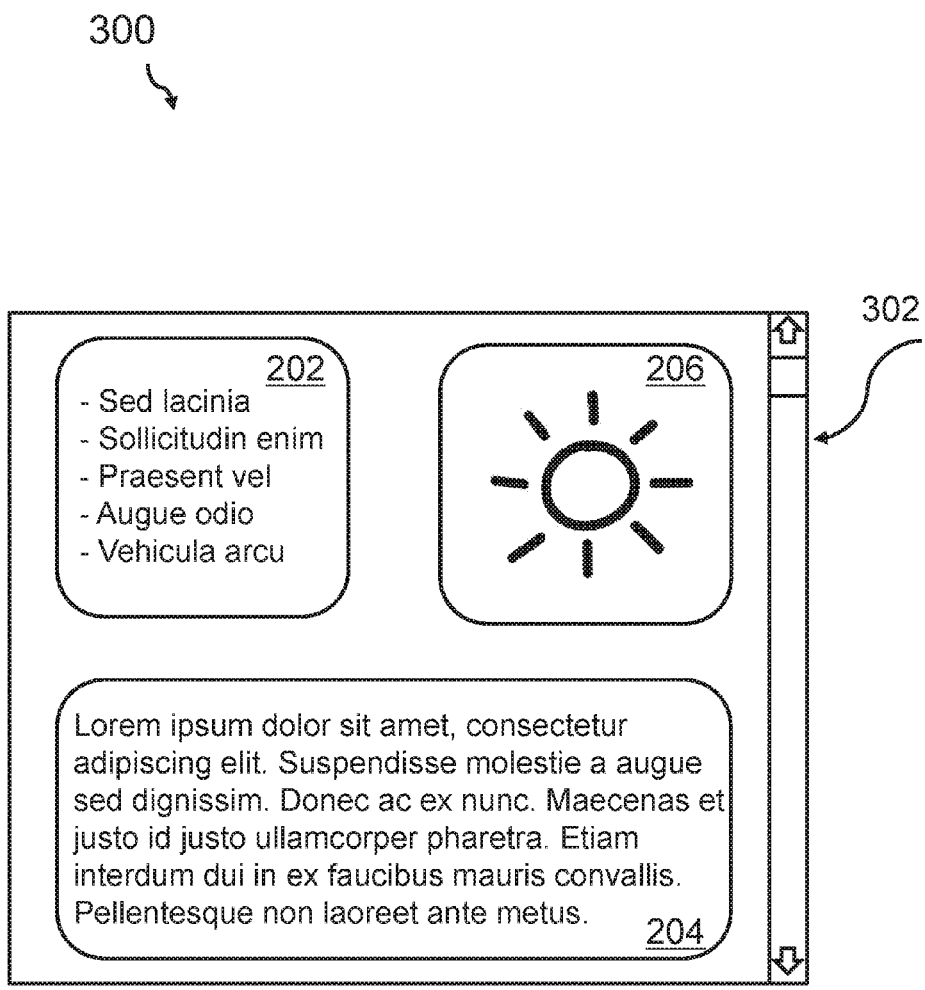
FIG. 3 shows a block diagram of an embodiment of a smaller viewport having a smaller width than the viewport according to FIG. 2, according to one embodiment.

FIG. 3 is a block diagram illustrating a smaller viewport 300 having a smaller width than the viewport 200, according to one embodiment. As an example, the viewport 300 may be displayed on a smaller screen of a tablet computer with, e.g., a 3:4 aspect ratio. Consequently, not all elements 202-208 may be rendered as in the case of the personal computer wide screen, as mentioned above. However, also the here shown layout of the viewport may be within design limits. The additional element 208 may be reached by scrolling down using the scrollbar 302.

Figure 4:
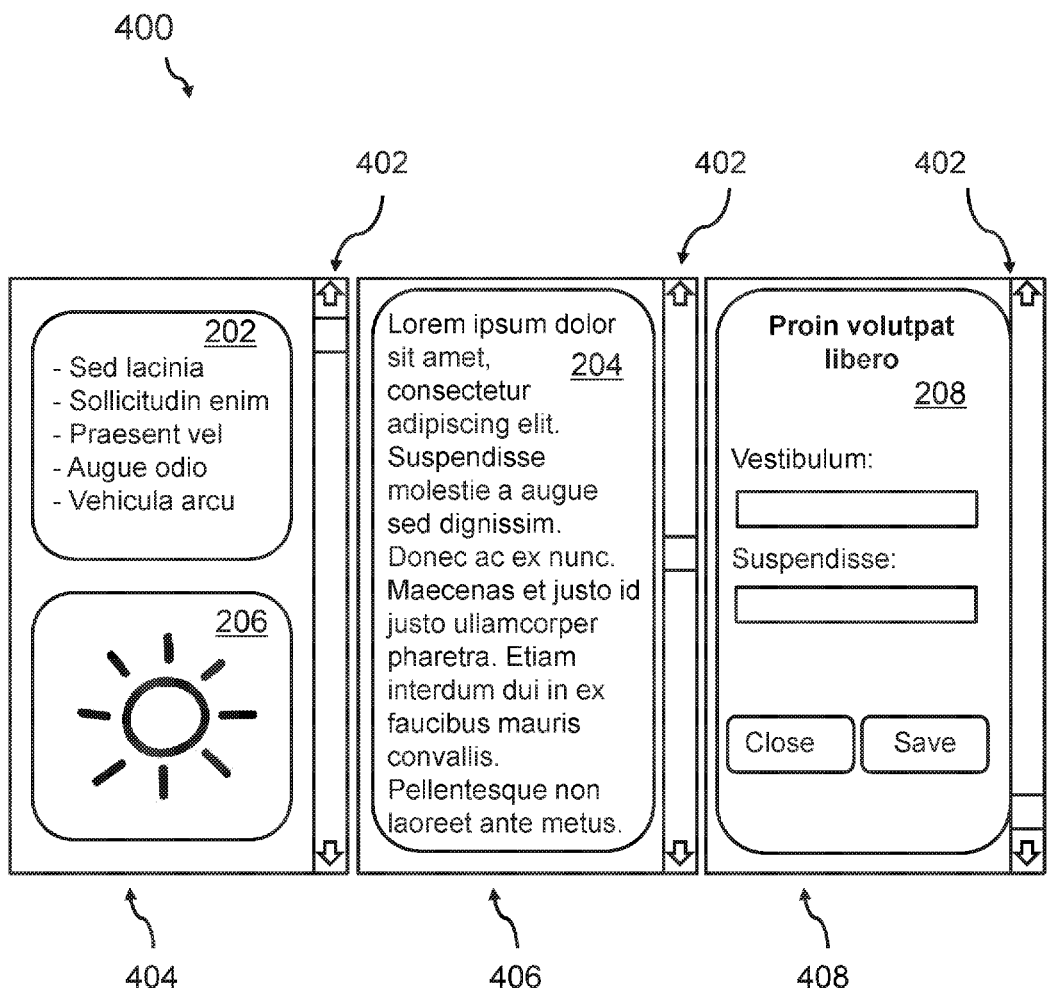
FIG. 4 shows a block diagram of an embodiment of an even smaller viewport with a portrait layout, according to one embodiment.

FIG. 4 is a block diagram illustrating even smaller viewport 400 with a portrait layout, according to one embodiment. This may again be another layout on, e.g., a smartphone screen in a portrait layout. Also here, a scrollbar 402 has been added. The three different views 404, 406, 408 represent different viewports of the same web page, as can be seen by the square indicator of the scrollbar 402. Also, this may represent an allowed (in particular, not broken) layout.

FIG. 5 is a block diagram of illustrating a viewport 500 with badly arranged elements, according to one embodiment. In other words, the viewport 500 includes a "broken" layout. Indeed, the viewport 500 has design flaws in this portlet layout. There may be unused available space 502, an unnecessary scrollbar 504, unreachable application controls 506, incomplete accessible input fields 508, unreachable for web content 510 of element 202, web content 512 of element 206 moved out of the viewport 500, and web content 514 of element 202 hidden by another building block, i.e., element 504.

Embodiments disclosed herein ensure that layout mistakes, such as those depicted in FIG. 5, do not happen due to the usage of device dependent arrangement rules, even if responsive design methods are used. Therefore, for each allowed arrangement for a device hardware/software combination, a device dependent arrangement rule is accompanying each rendered view.

Embodiments disclosed herein may not replace methods for responsive design or add-ons in browser to handle responsive design code. However, the here proposed software agent is active in addition to the add-on managing the responsive design because the responsive design concept is not a validation framework and does not guarantee the rendering of the intended design on a given device hardware/software combination.

FIG. 6 illustrates two examples of device dependent arrangement rules: one on the left side and one on the right side of FIG. 6. A skilled person will recognize that the left device dependent arrangement rule is dedicated to a Chrome browser for a Windows operating system or a Firefox browser for a Windows operating system. The expression "type":"desktop" indicates the target machine is a desktop computer. Additionally, four blocks of vectors are given each comprising a lower bound for a length, an upper bound for a length, a lower bound for an angle and an upper bound for the angle. If seen in the context of polar coordinates, these values of the just-mentioned variables describes an area, in which an element may be placed in the viewport in compliance with design rules.

As can also be seen, a "vectorSum" is part of the device dependent arrangement rule. This vector sum is a sum of the vectors of the four blocks of vectors as described above. It may be clear that in other cases more or less than for elements represented by four blocks of vectors may be present in another viewport layout.

However, it may be understood that with using a reference vector sum for a reference design of an allowed layout of the viewport a web designer only has to care about the vectors Sum when defining conditions for compliance with an arrangement of elements of a mobile or any other device.

In case of the second device dependent arrangement rule on the right side of FIG. 6, the device is a tablet computer running the iOS® operating system. The remaining logic and parameters are the same as in the case of the first device dependent arrangement rule.

Figure 7:
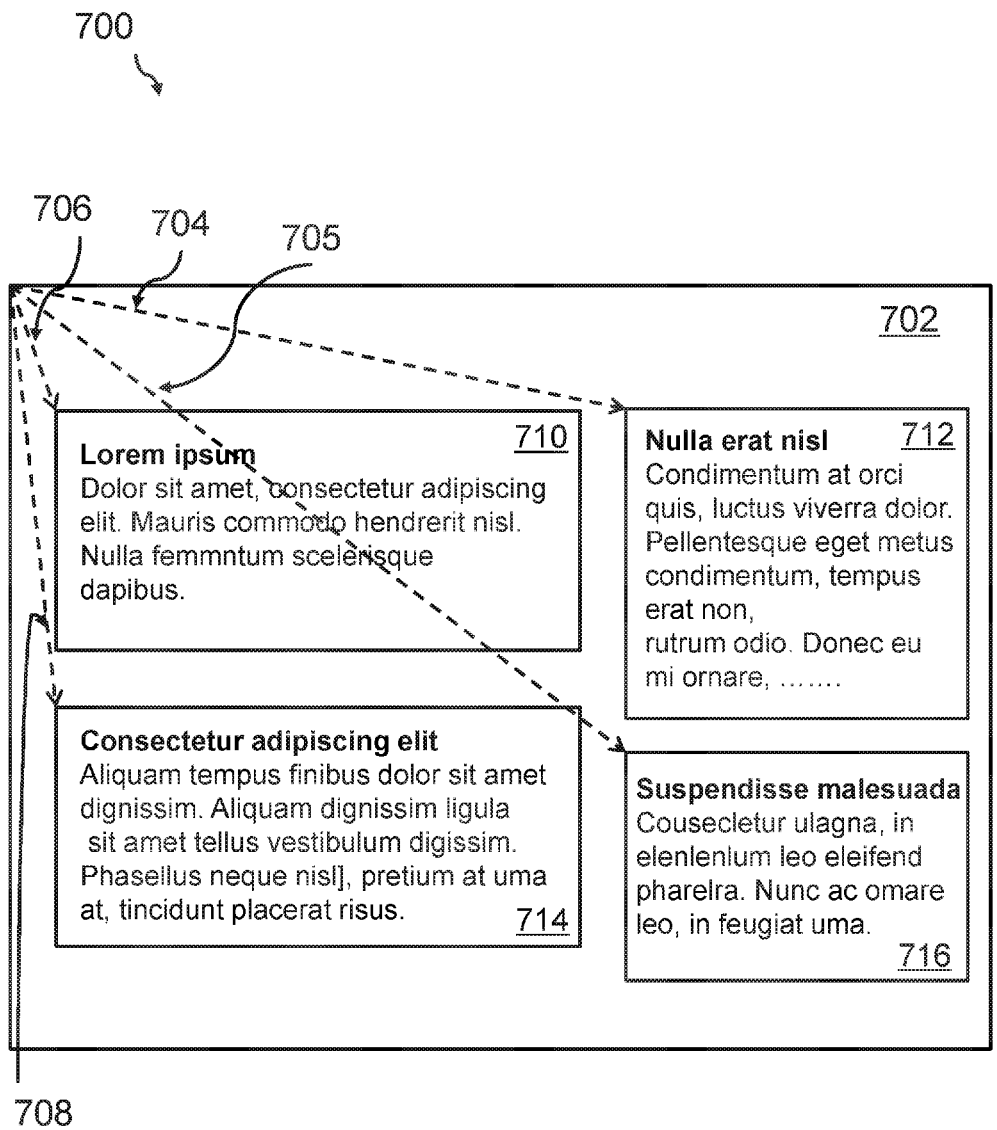
FIG. 7 shows an example of an arrangement of elements in a viewport which are in line with the device dependent arrangement rule, according to one embodiment.

FIG. 7 illustrates an example of an arrangement 700 of elements in a viewport 702 which is in line with the device dependent arrangement rule, according to one embodiment. Again, four elements 410, 412, 414 and 416 are shown. Additionally, vectors 704, 705, 706 and 708 are shown for the different building blocks. Exemplary, the following table may represent actual values in polar coordinates:

TABLE I

| element 710 | | | |
|---|---|---|---|
| x = 20 | y = 136 | angle = 81.83 element 712 | Length 137.46 |
| x = 740 | y = 136 | angle = 10.41 element 714 | Length 752 |
| x = 20 | y = 304 | angle = 80.24 element 716 | Length 304.66 |
| x = 740 | y = 342 | angle = 24.8 | Length 815.21 |

The software agent may build the vector sums. As shown, Table I depicts data for vector 706, vector 705, vector 708, and vector 704, the angle, and the respective link. Advantageously these values are in bound with the device dependent arrangement rule shown in FIG. 6, left side.

In addition, the respective values for the vector sums are within the limits defined in the rules of FIG. 6. Thus, the arrangement of elements in viewport 702 is an allowed arrangement and is in compliance with the device dependent arrangement rule. In at least one embodiment, the agent may compare the vector sums. If these values are not in compliance with one or more rules, the agent may determine that the layout is broken.

Figure 8:
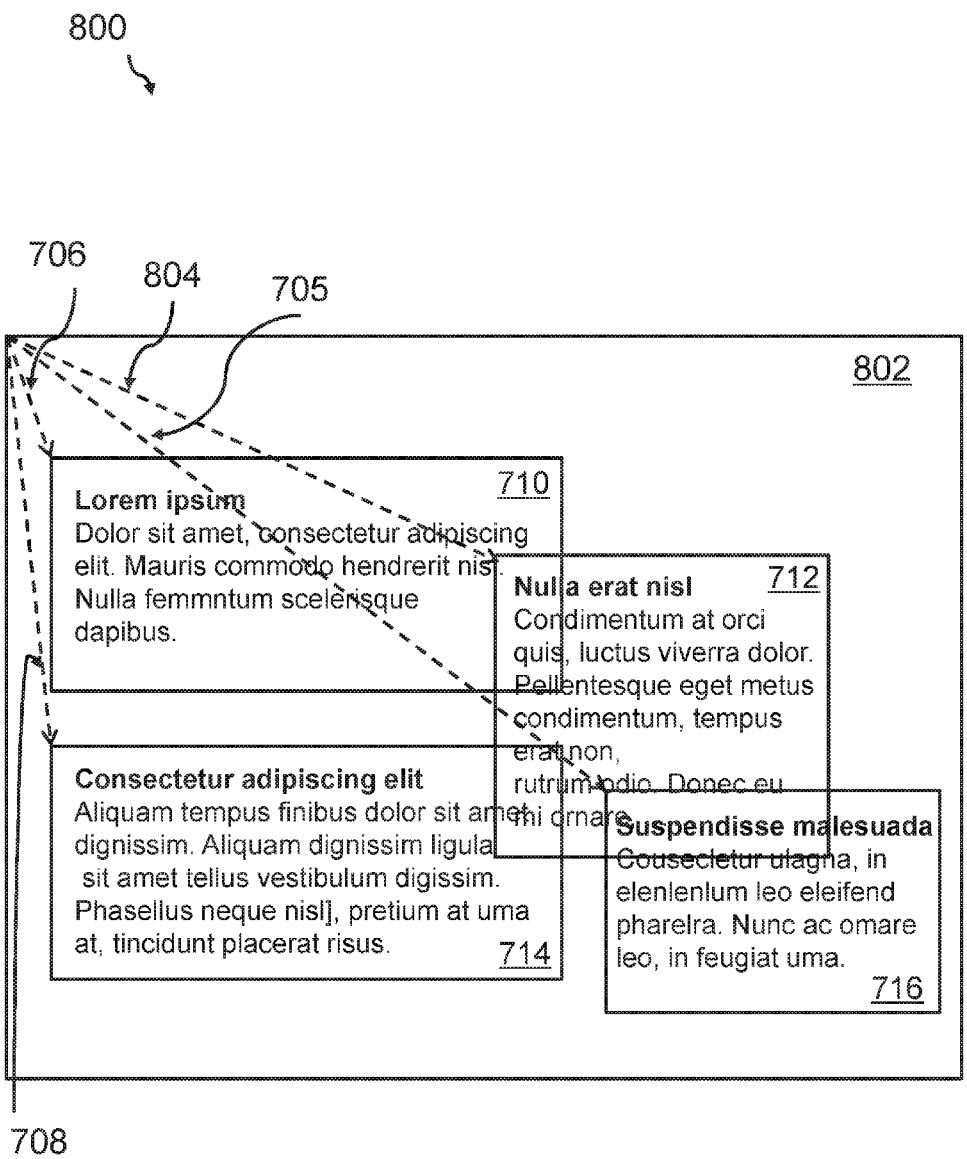
FIG. 8 shows an example of an arrangement of elements in a viewport which are not in line with the device dependent arrangement rule, according to one embodiment.

FIG. 8 illustrates an example arrangement 800 of elements in a viewport 802 which is not in line with the device dependent arrangement rule, according to one embodiment. In this example, element 712 and its respective vector 804 are not in compliance optical design rules (e.g., element 712 is on top of and/or behind at least a portion elements 710, 714, and 716). Thus, the layout is broken. Table II reflects a comparison of the exemplary coordinates and the vector sums:

TABLE II

| element 710 | | | |
|---|---|---|---|
| x = 20 | y = 136 | angle = 81.83 element 712 | Length 137.46 |
| x = 659 | y = 215 | angle = 18.07 element 714 | Length 693.19 |
| x = 20 | y = 304 | angle = 80.24 element 716 | Length 304.66 |
| x = 740 | y = 342 | angle = 24.8 | Length 815.21 |

In this case, for the vector 804 the angle of 18.07 degree is out of bounds (permissible values are 10.2 to 10.5, see FIG. 6, left side) as well as the x coordinate length of 659 (permissible values are 752.0 to 752.6, see FIG. 6, left side) if compared to the device dependent arrangement rule of FIG. 6, left side. Vector 705, vector 706, and vector 708 have respective angles in bounds, as well as respective length values in bounds. However, for the vector sum, the angle is out of bounds, as is the length.

The advantage of using the vector Sum is that irrespective of a specific element of a viewport, which may not be positioned correctly and therefore causing a broken layout, vector values out of bounds of the vector sum may indicate already a broken design. Thus, based on this respective measures may be taken in order to repair the broken layout, e.g., by computing a new device dependent arrangement rule, as well as sending information back to the server, in particular to the web content management system.

Figure 9:
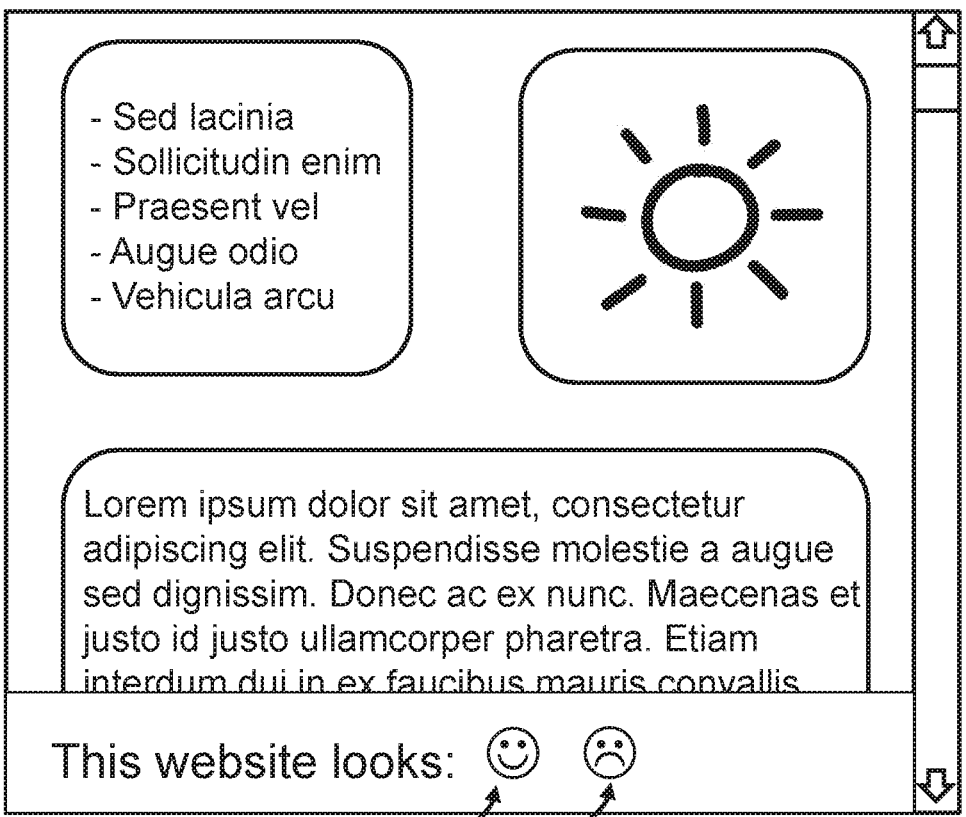
FIG. 9 shows an embodiment of a viewport comprising user feedback icons, according to one embodiment.

FIG. 9 illustrates an example viewport 900 providing user feedback icons 902, 904, according to one embodiment. The layout of this viewport 900 is based on the layout of the viewport 300 of FIG. 3. However, it may be assumed, this viewport 900 is displayed in a screen of an unknown device and that a re-rendering has been performed after non-compliance with known device dependent arrangement rules is detected. As can be seen in the bottom of the page there are two feedback buttons 902 and 904, which may be clicked by a user indicating that the web site looks good or not. Also, this information may be fed back to the server, in particular the web content management system.

Figure 10:
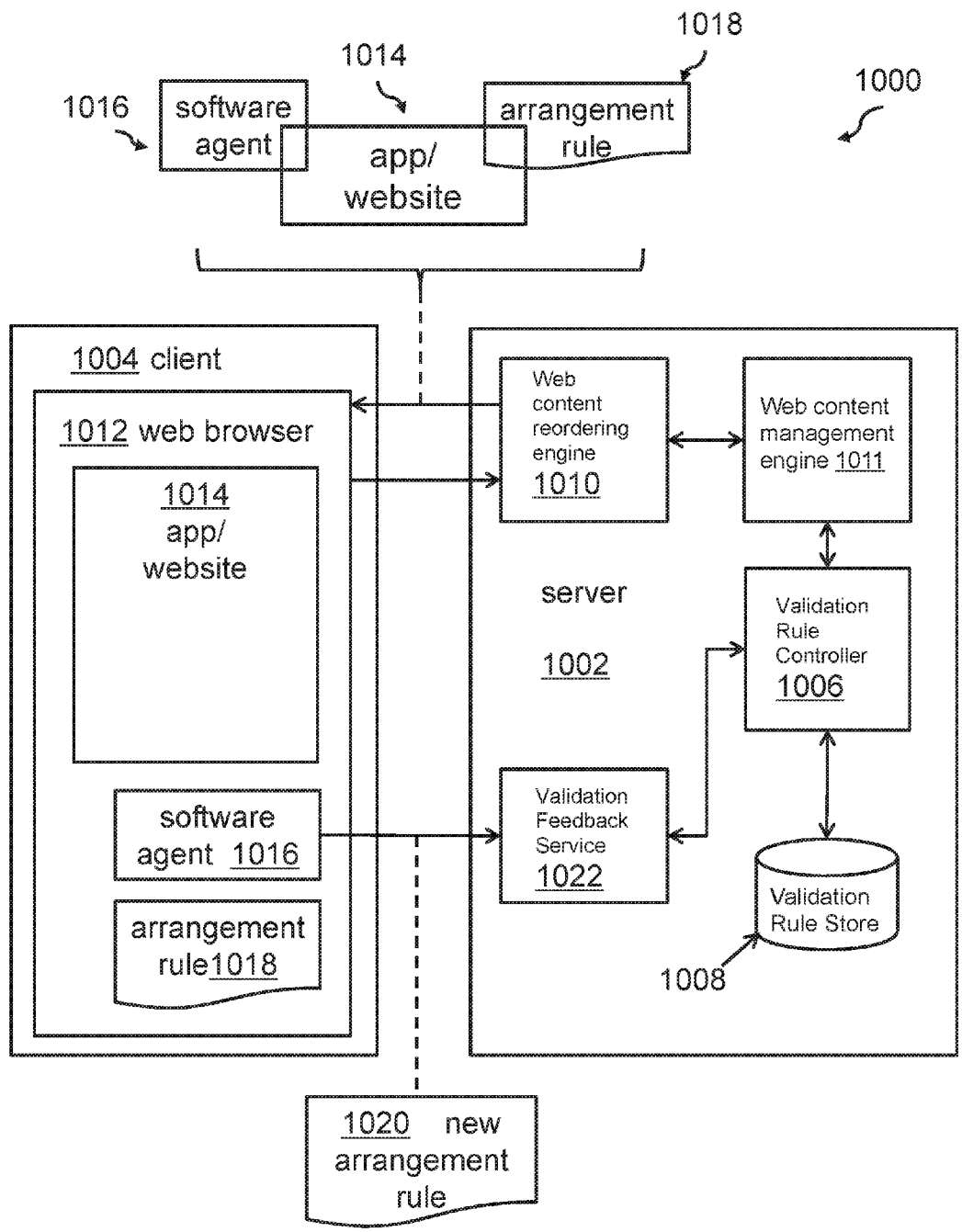
FIG. 10 shows an embodiment of a larger context of the inventive concept with a server and a client, according to one embodiment.

FIG. 10 is a logical view of a system 1000 which provides website validation for mobile devices. As shown, the system 1000 includes a server 1002 and a client 1004. On the server 1002 the web content management engine 1011 may be deployed, accessing a validation rule controller 1006 which may access a validation rule store 1008. Additionally shown, on the server-side, is the web content rendering engine 1010. The web content rendering agent 1010 sends information to the browser 1012 of the client 1004, and receives information from the client 1004.

From the server, 1002, in particular from the web content rendering engine 1010, the website or/and application 1014, is transmitted to the web browser 1012 together with the software agent 1016 and the device dependent arrangement rule(s) 1018. As explained above, in case of non-compliance with a device dependent arrangement rule, a new device dependent arrangement rule 1020 may be sent back from the browser 1012 via a validation feedback service 1022 to the validation rule controller 1006.

Figure 11:
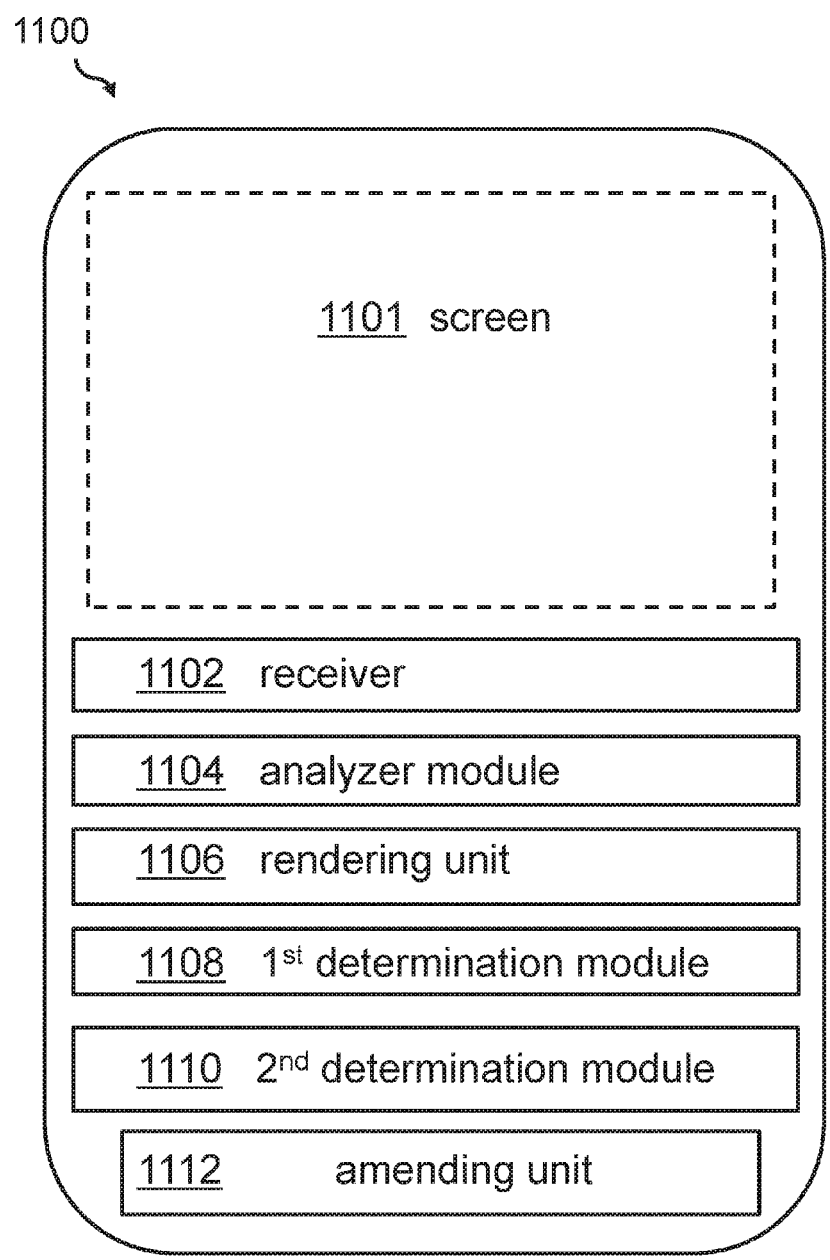
FIG. 11 shows a block diagram of an embodiment of the system for validating and adapting a graphical user interface structure to a screen of a client device, according to one embodiment.

FIG. 11 is a block diagram illustrating a client device 1100 which validates and adapts a graphical user interface structure, according to one embodiment. As shown, the client device 1100 includes a screen 1101. The client device 1100 includes a receiver 1102 adapted for receiving graphical user interface code (e.g., a web site) and the device dependent arrangement rule. Additionally, the client device 1100 comprises an analyzer module 1104 adapted for analyzing received graphical user interface code for identifying graphical user interface elements rendered by a rendering unit 1106 on the client device 1100, and a first determination module 1108 adapted for determining a relative arrangement of said rendered graphical user interface elements to each other and relative to the screen 1101.

Moreover, the client device 1100 comprises a second determination module 1110 adapted for determining whether a condition of the relative arrangement is in compliance with a device dependent arrangement rule. The second determination module 1110 is also configured to determine whether a distance between graphical user interface elements of the relative arrangement and a relative arrangement of the graphical user interface elements is in accordance with the device dependent arrangement rule, representing an improved arrangement. The client device 1100 also includes an amending unit 1112 configured to amend the graphical user interface code to rearrange the graphical user interface elements towards an improved arrangement. The rendering unit 1106 is also adapted for re-rendering said graphical user interface elements on the screen using the amended graphical user interface code.

Figure 12:
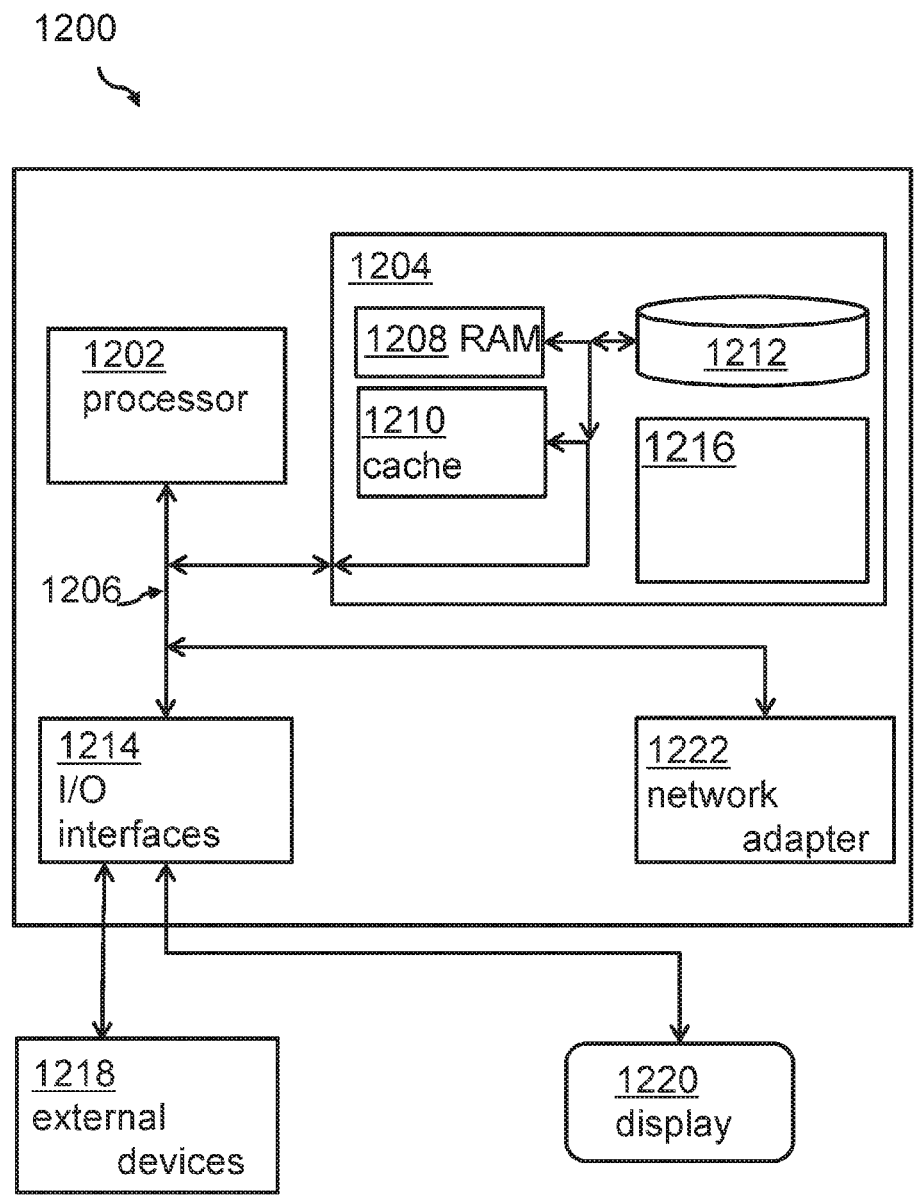
FIG. 12 shows an embodiment of a computing system comprising the system for validating and adapting a graphical user interface structure to a screen of a client device, according to one embodiment.

Embodiments of the disclosure may be implemented together on any type of computer, regardless of the platform being suitable for storing and/or executing program code. FIG. 12 depicts an example computing system 1200 which provides website validation for mobile devices, according to one embodiment. Generally, the computing system 1200 may be any type of computing device.

The computing system 1200 is only one example of a suitable computer system and is not intended to suggest any limitation as to the scope of use or functionality of embodiments described herein. Regardless, the computer system 1200 is capable of being implemented and/or performing any of the functionality set forth hereinabove. In the computer system 1200, there are components, which are operational with numerous other computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1200 is shown in the form of a computing device. The components of computer system/server 1200 may include, but are not limited to, one or more processors 1202, a system memory 1204, and a bus 1206 that couples various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, storage system 1212 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments disclosed herein.

Program/utility 1214, having a set (at least one) of program modules 1216, may be stored in memory 1204 by way of example, and not limitation, as well as an operating system, one or more application programs, other program modules, and program data. Each of the operating system, one or more application programs, other program modules, and program data or some combination thereof, may include an implementation of a networking environment. Program modules 1216 generally carry out the functions and/or methodologies of embodiments disclosed herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 1214. Still yet, computer system/server 1200 may communicate with one or more networks such as a local area network (LAN), a general wide area network (WAN), and/or a public network (e.g., the Internet) via network adapter 1222. As depicted, network adapter 1222 may communicate with the other components of computer system/server 1200 via bus 1206. It should be understood that although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

Additionally, the mobile device 1100 (not pictured) for validating and adapting a graphical user interface structure to a screen of a client device may be communicably coupled to the system 1200. It may also be noted that in case the computing device may be a smartphone, the keyboard and the screen may be integrated into one, as a touch sensitive screen. Such a screen may also be used instead of a pointing device for operating the GUI.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A method for validating and adapting a graphical user interface structure to a screen of a client device, the method comprising:
    receiving by the client device a software agent and a device dependent arrangement rule, the software agent being adapted for:
    analyzing received graphical user interface code for identifying graphical user interface elements to be rendered on said screen,
    determining a relative arrangement of said rendered graphical user interface elements to each other and relative to said screen, and
    if said relative arrangement is not compliant with said device dependent arrangement rule,
    determining a distance between graphical user interface elements of said relative arrangement and a relative arrangement of said graphical user interface elements in accordance with said device dependent arrangement rule, representing an improved arrangement,
    amending said graphical user interface code to rearrange said graphical user interface elements towards said improved arrangement, and
    re-rendering said graphical user interface elements for said screen using said amended graphical user interface code.

2. The method according to claim 1, wherein the graphical user interface elements are described using CSS classes.

3. The method according to claim 1, wherein a web content management system generates a proposal for a definition of a required CSS class for at least one of the graphical user interface elements and a proposal for a device dependent arrangement rule during a web page design process.

4. The method according to claim 1, wherein analyzing said graphical user interface elements comprises:
    using polar coordinates for a respective reference point of each graphical user interface element relative to a reference point of said screen.

5. The method according to claim 1, wherein said device dependent arrangement rule comprises a definition of a rendering environment and a validation rule comprising reference data values for validating a given rendering of said graphical user interface elements.

6. The method according to claim 5, wherein said definition of a rendering environment comprises at least one out of the group comprising a class of a mobile device, a layout mode, a web browser name, and a related web browser version.

7. The method according to claim 5, wherein said validation rule defines at least one condition selected out of the group comprising: any two of said graphical user interface elements are non-overlapping when being rendered on said screen, said graphical user interface elements are rendered inside a viewport, unused viewport space is above a predefined threshold value, and only reachable application control buttons exist in said viewport.

8. The method according to claim 1, further comprising:
    determining that no device dependent arrangement rule exists,
    computing a new device dependent arrangement rule,
    re-rendering said graphical user interface elements under constraints of said new device dependent arrangement rule, and
    displaying said re-rendered graphical user interface elements together with a feedback input field.

9. The method according to claim 8, further comprising:
    sending said new device dependent arrangement rule to a server for a validation, and
    sending collected information about the compliance to said server.

10. A system for validating and adapting a graphical user interface structure to a screen of a client device, the system comprising:
    a processor; and
    a memory containing a program which when executed by the processor performs an operation comprising:
    receiving, by said client device, graphical user interface code and a device dependent arrangement rule, analyzing received graphical user interface code for identifying graphical user interface elements to be rendered on said screen, determining a relative arrangement of said rendered graphical user interface elements to each other and relative to said screen, and upon determining that said relative arrangement is not compliant with said device dependent arrangement rule, determining a distance between graphical user interface elements of said relative arrangement and a relative arrangement of said graphical user interface elements in accordance with said device dependent arrangement rule, representing an improved arrangement, amending said graphical user interface code to rearrange said graphical user interface elements towards said improved arrangement, and re-rendering said graphical user interface elements on said screen using said amended graphical user interface code.

11. The system according to claim 10, the graphical user interface elements are described using CSS classes.

12. The system according to claim 10, wherein a web content management system generates a proposal for a definition of a required CSS class for at least one of the graphical user interface elements and a proposal for a device dependent arrangement rule during a web page design process.

13. The system according to claim 10, wherein analyzing said graphical user interface elements comprises:

using polar coordinates for a respective reference point of each graphical user interface element relative to a reference point of said screen.

14. The system according to claim 10, wherein said device dependent arrangement rule comprises a definition of a rendering environment and a validation rule comprising reference data values for validating a given rendering of said graphical user interface elements.

15. The method according to claim 14, wherein said definition of a rendering environment comprises at least one out of the group comprising a class of a mobile device, a layout mode, a web browser name, and a related web browser version.

16. The system according to claim 15, wherein said validation rule defines at least one condition selected out of the group comprising: any two of said graphical user interface elements are non-overlapping when being rendered on said screen, said graphical user interface elements are rendered inside a viewport, unused viewport space is above a predefined threshold value, and only reachable application control buttons exist in said viewport.

17. The system according to claim 10, the operation further comprising:

determining that no device dependent arrangement rule exists, and computing a new device dependent arrangement rule.

18. The system according to claim 17, the operation further comprising:

sending said new device dependent arrangement rule to a server for a validation.

19. A computer program product for validating and adapting a graphical user interface structure to a screen of a client device, the computer program product comprising a computer readable storage medium having program instructions embodied therewith, said program instructions being executable by one or more computing systems to cause said one or more computing systems to:

receive by said client device a software agent together with a device dependent arrangement rule, said software agent comprising program instructions that when executed by said computing system causes said computing system to analyze received graphical user interface code for identifying graphical user interface elements to be rendered on said screen, determine a relative arrangement of said rendered graphical user interface elements to each other and relative to said screen, if said relative arrangement is not compliant with said device dependent arrangement rule, determine a distance between graphical user interface elements of said relative arrangement and a relative arrangement of said graphical user interface elements in accordance with said device dependent arrangement rule, representing an improved arrangement, amending said graphical user interface code to re-arrange said graphical user interface elements towards said improved arrangement, and re-rendering said graphical user interface elements for said screen using said amended graphical user interface code.

* * * * *